United States Patent [19]

Sirinek

[11] 3,721,449

[45] March 20, 1973

[54] SOUND REPRODUCING DEVICE

[75] Inventor: Richard Sirinek, Cambria Heights, N.Y.

[73] Assignee: Brumberger Co., Inc., New York, N.Y.

[22] Filed: April 28, 1970

[21] Appl. No.: 32,575

[52] U.S. Cl. ....................................274/1 A, 274/9 R
[51] Int. Cl. ............................G11b 25/04, A63l 3/28
[58] Field of Search ............................274/1 A, 7, 9 R

[56] References Cited

UNITED STATES PATENTS

| | | | |
|---|---|---|---|
| 3,401,942 | 9/1968 | Strauss | 274/1 A |
| 3,292,932 | 12/1966 | Wolf | 274/1 A |
| 3,411,790 | 11/1968 | Suchowski | 274/1 A |
| 3,589,735 | 6/1971 | Watanabe | 274/1 A |
| 3,480,283 | 11/1969 | Jones et al. | 274/1 A |
| 3,572,704 | 3/1971 | Glass et al. | 274/1 A |

FOREIGN PATENTS OR APPLICATIONS

| | | | |
|---|---|---|---|
| 1,176,130 | 1/1970 | Great Britain | 274/1 A |

*Primary Examiner*—Leonard Forman
*Assistant Examiner*—Steven L. Stephan
*Attorney*—Lackenbach & Lackenbach

[57] ABSTRACT

A turntable mounted for rotation about a perpendicular axis and for reciprocation along the axis and carrying a record, a pickup arm pivotally mounted for movement parallel the record surface having a stylus engaging the record; a sound reproducing speaker engaged with the pickup opposite the record; biasing means for urging the stylus towards the rim of the record; a spring for urging the record towards the pickup arm; manually operably means for moving the record against the spring means to release the stylus from engagement therewith; motor means for rotating the record and switch means for stopping the turntable when the stylus and pickup arm approach the center of the record.

8 Claims, 5 Drawing Figures

INVENTOR.
RICHARD SIRINEK

BY
Rackenbach & Rackenbach
ATTORNEYS

INVENTOR:
RICHARD SIRINEK
BY
Lackenbach & Lackenbach
ATTORNEYS

INVENTOR.
RICHARD SIRINEK

BY
Rackenbach & Rackenbach
ATTORNEYS

SOUND REPRODUCING DEVICE

The present invention relates to a sound reproducing device and, more particularly, to a sound reproducing device for repeatedly playing a record.

The present invention is connected to a phonograph of the type which may be incorporated in toys, such as dolls, animals, telephones, and the like, from which it is desired to have sounds emitted.

The present phonograph is adapted to utilize a small record of the disk type, together with a reproducing system adapted to play the record and utilizes spring pressure, rather than gravity, to retain the stylus engaged with the record so that the mechanism may play in substantially any positional orientation, without having the stylus jump the groove, or the like, and even during movement of the phonograph unit. The phonograph unit is substantially automatic in operation, requiring only that a single pushbutton be depressed to initiate playing of the record and incorporating automatic shut-off when the record has completed playing.

A primary object of the present invention, accordingly, is the provision of novel and improved phonograph units of the type described.

Another primary object of the present invention, in addition to the foregoing, is the provision of phonograph units of the type described which are inexpensive while yet being sturdy and durable.

Another primary object of the present invention, in addition to the foregoing objects, is the provision of a phonograph of the class described which may be played regardless of the position or orientation.

A further object of the present invention, in addition to each of the foregoing objects, is the provision of a phonograph of the class described which may be operated in a simple manner and which is provided with re-set mechanism adapted to immediately place the reproducer stylus at the start of the record upon the operator depressing a start button.

A still further primary object of the present invention, in addition to each of the foregoing objects, is the provision of a phonograph of the class described having means for holding the reproducer stylus with constant pressure in the groove of the record during rotation of the record to prevent the stylus from jumping.

Further, it is another primary object of the present invention, in addition to each of the foregoing objects, to provide a phonograph constructed and arranged to automatically stop upon completion of the playing of the record.

Yet further, it is still another primary object of the present invention, in addition to each of the foregoing objects, to provide positive means, in electrically driven phonographs of the class described, which assures a disconnection of the motor from the electrical source when the playing of the record has been completed and which means will not be closed inadvertently, even upon rough handling of the phonograph so that the electrical circuit is not re-established to the motor except upon actuation of a start button.

A still further primary object of the present invention, in addition to each of the foregoing objects, is the provision, in phonographs of the class described, of a novel accoustic system.

It is a feature of the present invention that mechanisms constructed in accordance herewith are inexpensive to manufacture while being yet durable and effective in use.

The invention resides in the combination, construction, arrangement and disposition of the various component parts and elements incorporated in improved sound reproducing devices constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

For convenience in description, the terms "upper," "lower," "inner," "outer," "left," "right," "front" "-back," "side," and derivatives thereof will have reference to the orientation as shown in the respective figures of the drawing. Such terminology as used in the ensuing description and the subjoined claims, along with other similar directional terminology, is to be construed and interpreted, however, in its normal and accepted sense and is not to be construed and interpreted in a limiting sense since the same is used merely to facilitate an understanding of and to clearly set forth and particularly define the present invention.

IN THE DRAWING

Figures 1, 2:
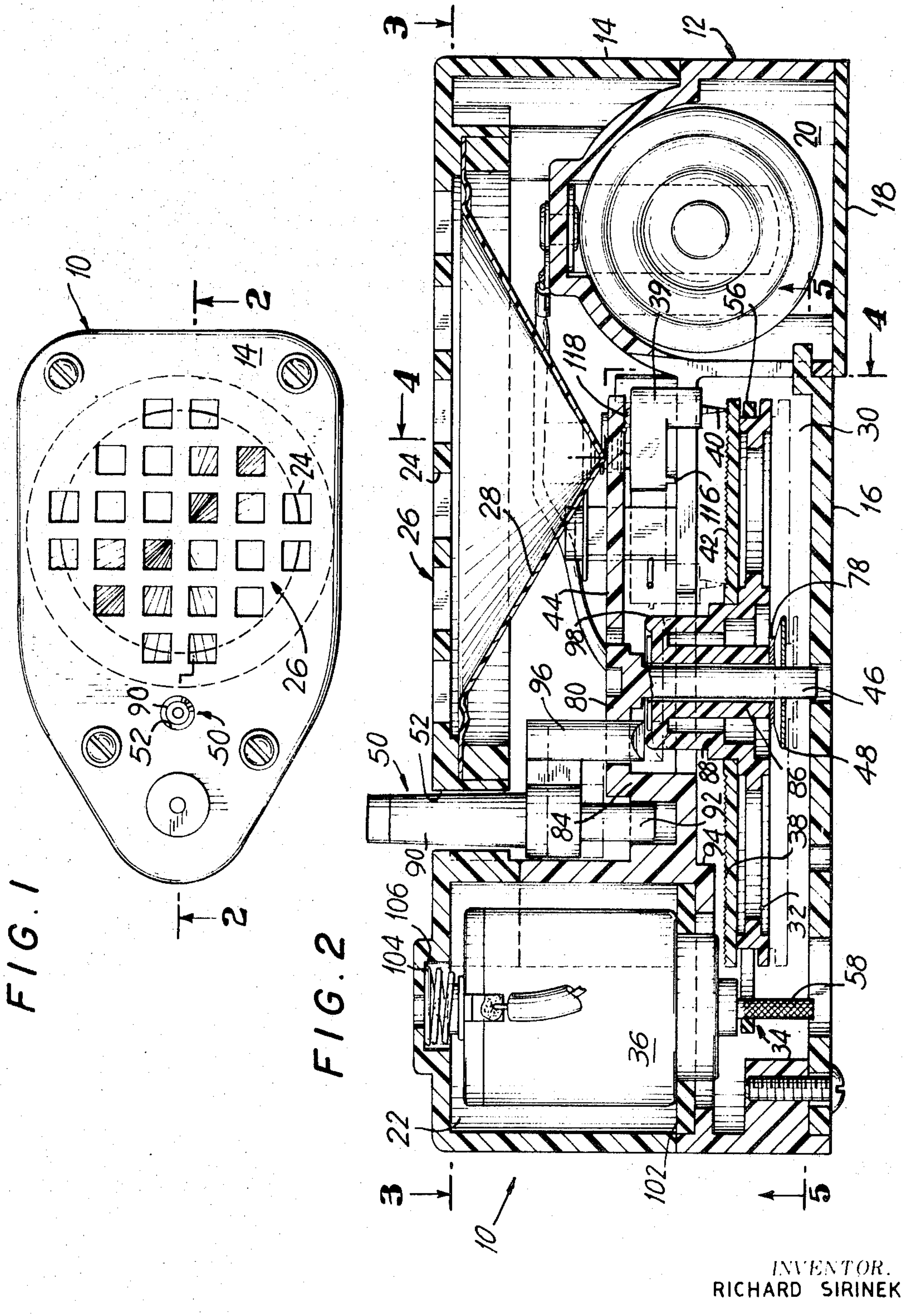
FIG. 1 is a top plan view of a sound reproducing unit or device constructed in accordance with the principles of the present invention.
FIG. 2 is an enlarged side elevational cross-sectional view taken along line 2—2 of FIG. 1.
Figure 3:
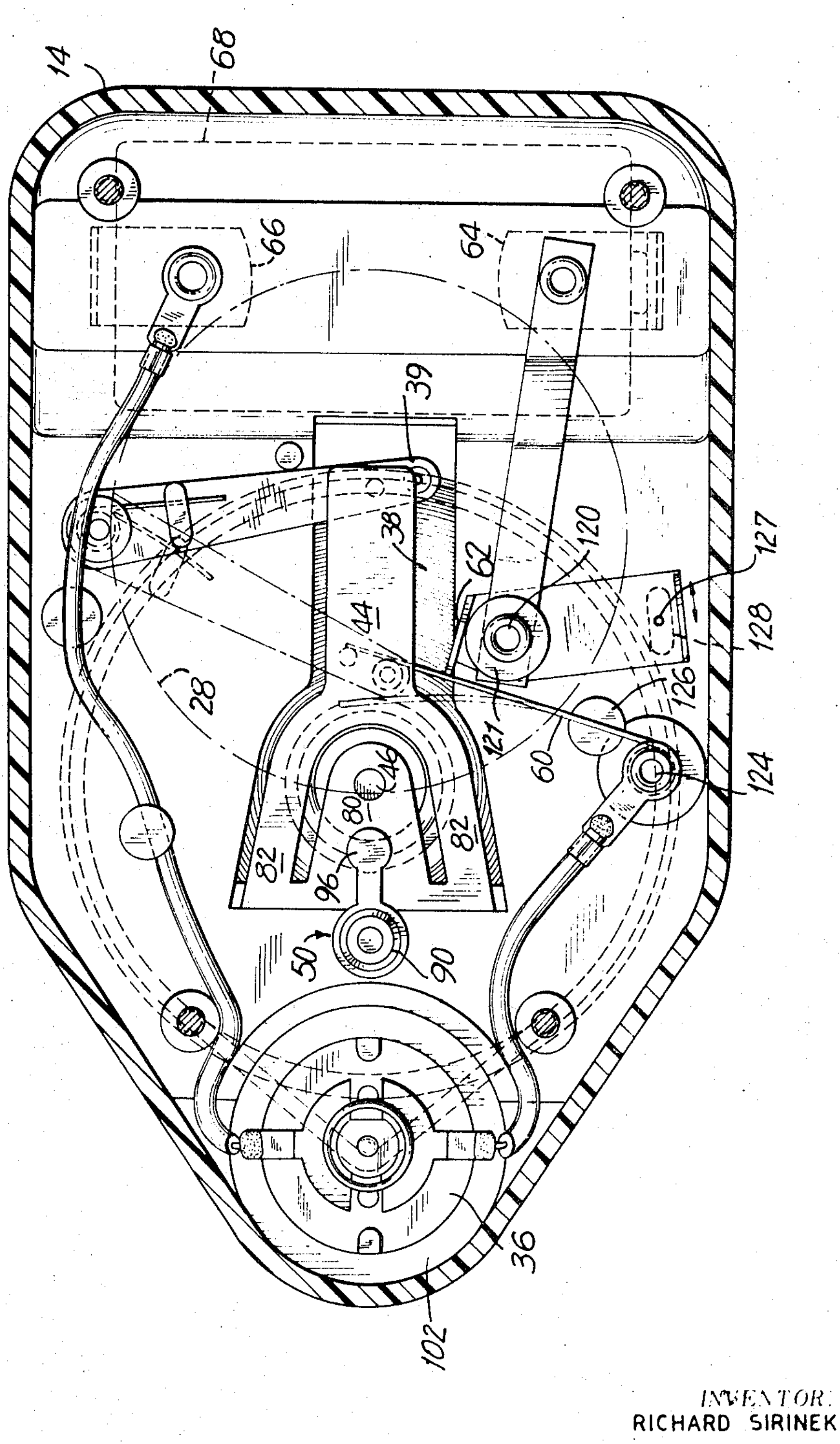
FIG. 3 is a cross-sectional plan view taken along line 3—3 of FIG. 2.
Figures 4, 5:
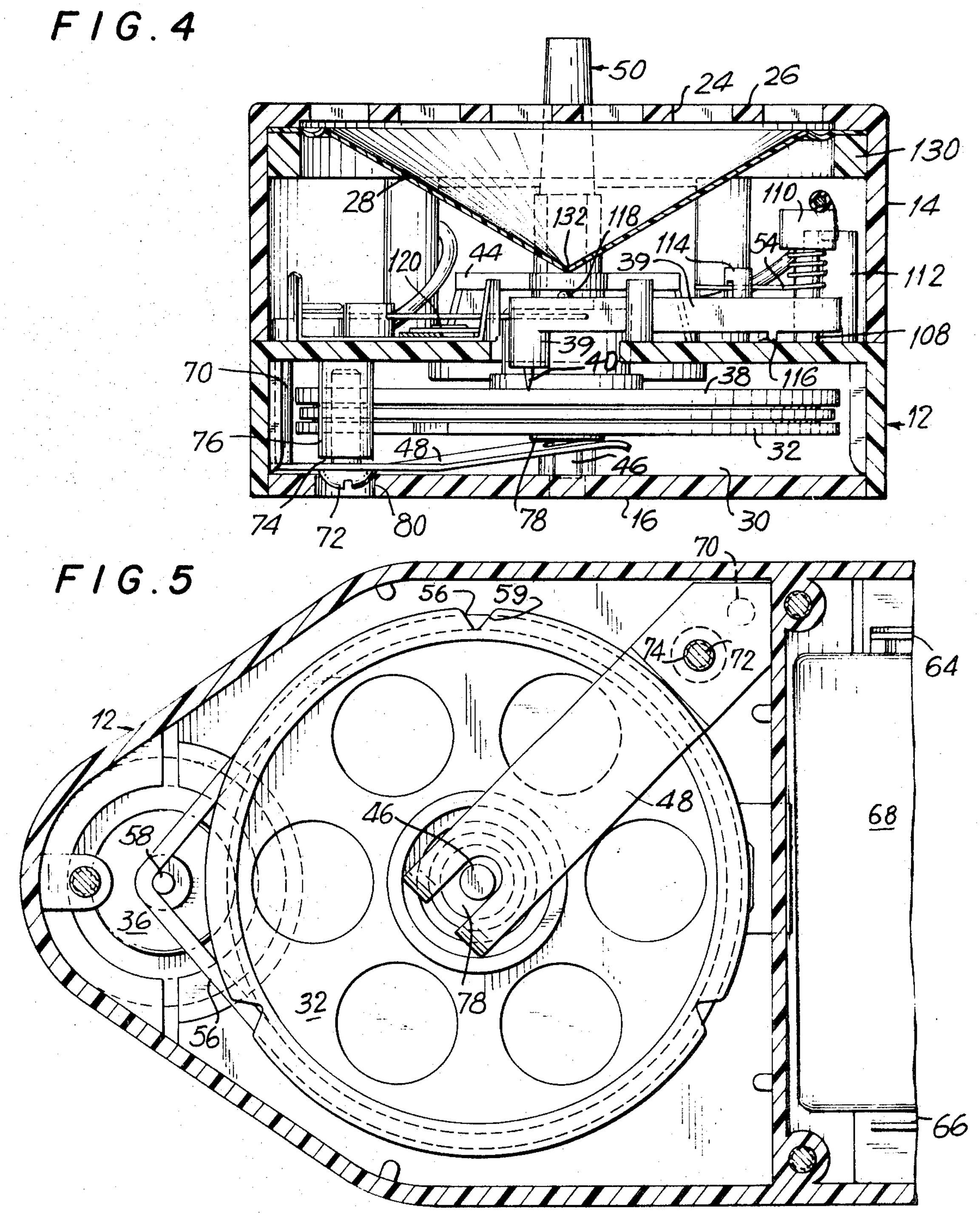
FIG. 4 is an end elevational cross-sectional view taken along line 4—4 of FIG. 2.
FIG. 5 is a bottom plan cross-sectional view taken along line 5—5 of FIG. 2.

With reference now to the drawing, there is shown and illustrated a sound reproducer device constructed in accordance with the principles of the present invention and designated generally by the reference character 10 which is contained within a housing defined by a mounting base 12, a top cover 14, a bottom cover plate 16 and a battery access cover 18. The plan view of the completed sound reproducing device 10 is, as seen in FIG. 1 and 3, of generally five-sided configuration, one end portion thereof being generally rectangular with the other end portion thereof being of reduced width so as to be generally triangular. In elevation, the device 10 is of generally constant height. In other words, the general, overall configuration may be defined broadly as a triangular prism having a cross-section defined by an isosceles triangle extending from a rectangular solid its short side congruent and of similar width as the base of the triangular prism. A battery compartment 20 extends generally transversely across the housing adjacent said one end portion thereof and a motor compartment 22 extends generally vertically of the housing adjacent the other end portion thereof. The top cover 14 may be provided with a plurality of apertures 24 defining therein a speaker grille portion 26 and there may be disposed generally beneath the speaker grille portion 26, a reproducer element or cone 28 extending generally medially between the battery compartment 20 and the motor compartment 22 on the top side of the mounting base 12. The battery compartment 20 may extend generally beneath the mounting base 12 and the motor compartment 22 generally above the mounting base 12.

Disposed generally beneath the mounting base 12, there may be provided a record compartment 30 within which a turntable 32 is mounted for rotation by means of a drive system 34 from an electric motor 36 disposed within the motor compartment 22. A record 38 may be carried by the turnable 32 for rotation therewith.

A tone arm 39 may be pivotally carried by the mounting base 12 carrying, in turn, a needle or stylus 40 for engaging the sound groove 42 of the record 38 and transmitting vibrations developed thereby to the speaker cone 28, as through a sound transfer fork engaged therebetween. Hence, upon rotation of the turntable 32 and record 38, movement of the stylus or needle 40 along the sound groove 42 thereof will result in vibration being induced in the tone arm 39, transferred therefrom to the sound transfer fork 44 and thence to the reproducer cone 28 to produce airborne sound waves propagated through the apertures 24 of the speaker grille portion 26. The turntable 32 may be rotatably carried on a spindle 46 mounted with the mounting base 12 and slidable generally axially therealong, there being further provided a turntable biasing spring 48 for biasing the turntable and record 38 towards the stylus 40, tone arm 39, sound transfer fork 44 and reproducer cone 28 with a generally constant force to maintain the needle or stylus 40 engaged with the sound groove 42.

An activating button 50 may be provided extending outwardly of the housing, for example, through an aperture 52 provided in the housing top cover 14 for sliding movement relative thereto and generally parallel the axis of the spindle 46 for moving the turntable 32 and record 38 generally downwardly along the spindle 46 against the biasing of the spring 48 so as to disengage the stylus 40 from the record groove 42 and enable the tone arm 39 to move independently thereof. A tone arm biasing means, such as a return spring 54 may be provided tending to urge the tone arm 39 for movement so that the stylus or needle 40 moves towards the periphery of the record 38. Therefore, when the needle or stylus 40 is engaged with the record groove 42 and the record 38 rotated, the needle or stylus 40 and the associated end of the tone arm 39 will move generally inwardly toward the spindle 46 and, upon movement of the turntable 32 and record 38 downwardly along the spindle 46 against the biasing spring 48 so as to disengage the needle or stylus 40 from the record groove 42, the tone arm 39 will return to its initial or starting position with the needle or stylus 40 positioned at the start of the groove 42 adjacent the periphery of the record 38.

The drive system 34 may, for example, comprise a rubber belt 56 extending peripherally about the turntable 32 and the armature output shaft 58 of the drive motor 36. The switch, comprising an armature or movable element 60 fabricated, for example, of a wire spring, or the like, positioned for engagement by the tone arm 39 as the stylus 40 approaches the center of the record 38 to move the movable element 60 away from a fixed element 62 carried, for example, by the mounting base 12 may be disposed in electrical series relationship between the motor 36 and a pair of battery terminals 64 and 66 within the battery compartment 24 making electrical connection with an electrical energy cell or battery 68. Therefore, when the stylus or needle 40 is in any position generally radially outward of the inner end of the groove 42, the switch will be closed, the motor will be actuated, and the turntable will rotate. When, however, the needle 40 reaches the end or inside of the groove 42, the movable switch elements 60 will be moved out of engagement away from the fixed switch element 62, the circuit between the electrical energy cell 68 and the motor 36 will be broken, and rotation of the turntable 32 will stop. When the activating button 50 is depressed, the turntable and record 42 will move against the biasing spring 48, the needle 40 will return to the outside or start of the groove 42 and the motor 36 will again be actuated so that as the needle 40 moves along the groove 42, sound will be generated in the tone arm 39 and transmitted through the sound transfer fork 44 to the speaker or reproducer cone 28 for the generation of audible sound waves and propagation thereof outwardly through the apertures 24 of the speaker grille portion 26. As may be seen, the sound transfer fork 44 enables the tone arm 39 to move across the surface of the record 38 while still maintaining sliding engagement with the sound transfer fork 44 which, in turn, is generally fixed relative to the speaker reproducer cone 28.

The turntable biasing spring 48 determines the stylus pressure. To enable adjustment of the stylus pressure, through adjustment of the force generated by biasing spring 48, the biasing spring 48 may be supported, for example, in a cantilevered relationship with the fixed end abutting a post 70 extending downwardly from the mounting base 12, an intermediate portion being supported in the opposite direction by an adjustable support, such as a screw 72 extending through an aperture 74 provided in the spring 48 and engaged with a post 76 extending downwardly from the mounting base 12 in generally parallel relationship to the post 70 and the outboard end portion of the spring 48 biasing the turntable 32 upwardly, as through a thrust washer 78. If an aperture 80 is provided in the bottom cover plate 16 in general alignment with the screw 72, then the stylus pressure adjustment may be performed after final assembly and during testing of the device.

In fact, the entire device 10 is particularly designed and configurated for simple inexpensive assembly and to enable testing and/or adjustment. Substantially all of the operating parts, except for the sound reproducing cone 28 are carried by the mounting base portion 12. And, therefore, the device may be operated before any of the cover panels are positioned. In this way, the switch movable element 60 which, as heretofore pointed out, comprises a wire form may be bent, and otherwise adjusted as required to interrupt the circuit to the motor 36 at the desired location of the stylus 40.

More particularly, as heretofore pointed out, the biasing spring 48 is supported from the mounting base portion 12 on the support posts 70 and 76. Similarly, the turntable 32 is rotatably carried from the mounting base portion 12 on the spindle 46. The spindle 46, in turn, extends generally downwardly from a tongue 80 projecting generally between the bifurcations 82 of the sound transfer fork 44, the tongue 80 and bifurcations 82 extending in cantilevered relationship from an upstanding bracket portion 84 forming a part of the mounting base portion 12. Therefore, any vibration from the spindle 46 will not be transferred to the sound transfer fork 44 but, rather, will be absorbed by the mounting base 12. The turntable 32, in turn, comprises a central apertured bearing portion 86 extending around the spindle 46 and defining a generally cup-like portion 88 for aligning the record 38 and upon which the activating button 50 may react.

The activating button 50, in turn, is supported on the mounting base 12 and may be of any configuration which may be generally described as a lower case H having an activating or push button portion 90 in generally axial alignment with a guiding portion 92 extending into an aperture 94 provided in the mounting base portion 12 and a leg portion 96 generally parallel thereto for engaging the upper edge portion or rim 98 of the turntable central portion 88. The activating button 50 may be further supported, as heretofore pointed out, in the aperture 52 extending through the top cover 14.

The motor 36 may similarly be supported on the mounting base portion 12, as by means of a rubber washer 102 engaging the end thereof adjacent the output shaft 58. The motor 36 may be further held in position, on final assembly, by means of a resilient mount, such as a coil spring 104 or a similar elastomeric washer engaging a recess 106 in the top cover 14. The tone arm 39 and the tone arm biasing spring 54 may be mounted on a post 108 extending generally upwardly from the mounting base portion 12 and secured thereon, as by means of a cap 110. One end portion of the spring 54 may engage a post 112 extending generally upwardly from the mounting base portion 12 in generally parallel relationship adjacent the post 108 and the other end portion of the spring 54 may engage a generally upstanding post 114 integrally formed with the tone arm 39 so as to bias the tone arm in the desired direction. A pair of knobs 116 and 118 may be formed on the tone arm 39 for additional guidance and for engagement with the sound transfer fork 44, respectively. Yet further, the fixed switch element 62 may be secured with the mounting base portion 12, as by means of a rivet 120 and cupped washer 121 and the movable spring element 60 may be secured by a rivet 124 and positioned and aligned between the legs of a bifurcated post 126. The fixed switch element 62 may, as illustrated, be pivoted on the rivet 120 so that pivotal movement thereof around the rivet 120 may be utilized to adjust the position thereof and, hence, the position of the tone arm whereat the circuit to the motor will be interrupted. To enable this adjustment even after assembly of the unit, the fixed switch element 62 may be provied with a small hole 127 for engagement by a pointed tool from the chamber 30 through, for example, an arcuate slot 128. The cupped washer 121 provides sufficient pressure to retain the element 62 after adjustment.

The speaker reproducer cone 28, however, preferably is secured with the cover portion 14, as by being cemented between the cover portion 14 and a retaining ring 130. The dimensions are preferably chosen such that, upon assembly of the cover portion 14 with the base mounting portion 12, the apex 132 of the reproducer cone 28 bears down on the sound transfer fork slightly which, in turn, bears down on the tone arm 39 and stylus 40 to push the record 38 and turntable 32 slightly downwardly against the turntable biasing spring 48. In this way, slight manufacturing tolerances can be compensated for, after assembly, by adjusting of the tension on the biasing spring 48 through the screw 72. Further, engagement of the stylus 40 with the record 38; and of the sound transfer fork 44 with each of the reproducer cone apex 132 and the tone arm projection 118 will be ascertained and assured.

An electric energy cell 134 may be positioned and retained within the battery compartment 20, as by means of a pair of terminal elements 136 and 138 engaged with opposite ends thereof. The rubber belt 56 is preferably elastic and in a stretched or elongated configuration when disposed around the turntable and armature shaft 58 so that it will effectively drive without the use of any idler pulleys, tensioning devices, or any special cross-section. In practice, it has been found that a simple square cut rubber band is satisfactory. The rim of the turntable 32 may further be provided with one or more notches 59 to enable the band or belt 56 to be readily and easily relocated, even with the unit assembled, if necessary.

The various dimensional and geometric relationships set forth hereinabove, have been set forth, not with the intent of having the invention limited thereby, but, rather, to aid in an understanding of the present invention. It is to be expressly understood that such relationships and configurations may be modified without departing from the scope of the present invention and any such modifications thereof as may be suggested to those having the benefit of the teachings herein are intended to be reserved, specifically as they fall within the scope and spirit of the subjoined claims.

Further, while the invention has been described, disclosed, illustrated and shown in terms of embodiments or modifications which it has assumed in practice, the scope of the invention should not be deemed to be limited by the precise embodiment or modification herein described, disclosed, illustrated or shown, such other embodiments or modifications as may be suggested to those having the benefit of the teachings herein being intended to be reserved especially as they fall within the scope and breadth of the claims here appended.

What is claimed is:

1. Sound reproducing device comprising, in combination, a generally disc-shaped record having a generally central aperture and provided with a generally spiral sound groove on one face thereof, a turntable for supporting said record for rotation about an axis generally perpendicular the center of said record, means for rotating said turntable, a tone arm carrying a stylus for movement along said groove, a speaker cone mounted above said tone arm having its apex directed generally towards said record and a sound transfer fork disposed in accoustic conductive relationship between said stylus and the apex of said speaker cone for conducting sound vibrations generated in said stylus by movement relative said groove to the apex of said speaker cone as said stylus moves radially across said record wherein said turntable is rotatably supported on a spindle, said sound transfer fork comprises a bifurcated face portion and said spindle is rotatably supported on a tongue disposed between the bifurcations of said sound transfer fork to provide a compact assembly wherein said sound transfer fork has an effective free length such that is extends beyond the center of said record.

2. Sound reproducing device defined in claim 1 further comprising a mounting base portion to which all of the moving components are attached, enabling testing and adjustment of the assembled device.

3. Sound reproducing device defined in claim 2 wherein said turntable is movable along said spindle towards and away from said tone arm together with means for biasing said turntable towards said tone arm to maintain said stylus in said groove, said biasing means comprising a leaf spring extending past said spindle from said mounting base portion.

4. Sound reproducing device defined in claim 3 wherein said turntable comprises a generally cylindrical boss surrounding said spindle and said leaf spring comprises a cantilevered spring having a bifurcated free end portion engaging said boss on opposite sides of said spindle.

5. Sound reproducing device defined in claim 4 further comprising a support post extending from said mounting base portion generally parallel said spindle for supporting the non-free end portion of said spring together with tensioning means acting generally parallel said post for drawing an intermediate portion of said spring towards said turntable to enable adjustment of the biasing applied thereto.

6. Sound reproducing device defined in claim 3 wherein said record is provided with a generally central circular aperture, said turntable comprising a generally cylindrical central boss extending through said aperture and there is further provided a manually depressable button adapted to engage said central boss for moving said turntable away from said stylus and against the biasing of said spring.

7. Sound reproducing device having a generally disk-shaped record with a generally spiral sound groove on one face thereof, means for rotating said record about its central axis, a tone arm having a stylus engaging said sound groove for sonic vibration thereby during rotation of the record, means for supporting said tone arm to enable movement of said stylus generally radially during rotation of said record, and a speaker cone mounted in spaced apart relationship to said one face of said record for driving by said stylus to produce audible sound, the improvement comprising a vibratile sound transfer member cantilevered to extend across said one face of said record between said tone arm and said speaker cone along at least the path of travel of said stylus and in generally fixed positional contact with the apex of said speaker cone and in sliding connection with said stylus for transmitting the vibrations of said stylus to said speaker cone and wherein said sound transfer member comprises a bifurcated member having its axis extending generally across the center of rotation of said record with the bifurcations being on opposite sides of said center of rotation so that the transfer member has an effective cantilevered length greater than the radius of the record without extending beyond the edges thereof together with support means for enabling rotation of said record positioned between the bifurcations of said member and wherein said support means comprises a spindle about which said record rotates having its axis extending between said bifurcations generally perpendicular the plane of said member and a tongue extending in the plane of said member between said bifurcations supporting said spindle.

8. Sound reproducing device comprising, in combination, a generally disk-shaped record with a generally spiral sound groove on one face thereof, means for rotating said record about its central axis, a tone arm having a stylus engaging said sound groove for sonic vibration thereby during rotation of the record, means for supporting said tone arm to enable movement of said stylus generally radially during rotation of said record, and a speaker cone mounted in spaced apart relationship to said one face of said record for driving by said stylus to produce audible sound, a vibratile sound transfer member cantilevered to extend across said one face of said record between said tone arm and said speaker cone along at least the path of travel of said stylus and in generally fixed positional contact with the apex of said speaker cone and in sliding connection with said stylus for transmitting the vibrations of said stylus to said speaker cone, wherein said sound transfer member comprises a bifurcated member having its axis extending generally across the center of rotation of said record with the bifurcations being on opposite sides of said center of rotation so that the transfer member has an effective cantilevered length greater than the radius of the record without extending beyond the edges thereof together with support means for enabling rotation of said record positioned between the bifurcations of said member and wherein said support means comprises a spindle about which said record rotates having its axis extending between said bifurcations generally perpendicular the plane of said member and a tongue extending in the plane of said member between said bifurcations supporting said spindle.

* * * * *